(12) United States Patent
Carmeli et al.

(10) Patent No.: US 7,970,828 B2
(45) Date of Patent: *Jun. 28, 2011

(54) LIVENESS MONITORING IN A PUBLISH/SUBSCRIBE MESSAGING SYSTEM

(75) Inventors: Boaz Carmeli, Koranit (IL); John J Duigenan, Bournemouth (GB); Gidon Gershinsky, Haifa (IL); Stephen J Todd, Winchester (GB); Graham D Wallis, West Wellow (GB)

(73) Assignee: International Business Machines Corporation, Armonk, NY (US)

( * ) Notice: Subject to any disclaimer, the term of this patent is extended or adjusted under 35 U.S.C. 154(b) by 2541 days.

This patent is subject to a terminal disclaimer.

(21) Appl. No.: 10/713,956

(22) Filed: Nov. 13, 2003

(65) Prior Publication Data

US 2004/0205439 A1 Oct. 14, 2004

(30) Foreign Application Priority Data

Apr. 8, 2003 (GB) .................................. 0308035.5

(51) Int. Cl.
*G06F 15/16* (2006.01)
(52) U.S. Cl. ........ 709/205; 709/203; 709/207; 709/208; 707/623
(58) Field of Classification Search .................. 709/205, 709/201, 207, 208; 707/623
See application file for complete search history.

(56) References Cited

U.S. PATENT DOCUMENTS

| | | | | |
|---|---|---|---|---|
| 5,842,210 A | * | 11/1998 | Chen et al. ........................ 707/10 |
| 5,870,605 A | * | 2/1999 | Bracho et al. ................. 719/318 |
| 5,946,670 A | * | 8/1999 | Motohashi et al. ........... 705/400 |
| 6,154,781 A | | 11/2000 | Bolam et al. |
| 6,182,143 B1 | | 1/2001 | Hastings et al. |
| 6,243,749 B1 | | 6/2001 | Sitaraman et al. |
| 6,269,080 B1 | | 7/2001 | Kumar |
| 6,336,119 B1 | | 1/2002 | Banavar et al. |
| 6,470,325 B1 | | 10/2002 | Leemhuis |
| 6,594,787 B1 | | 7/2003 | Chesson |
| 6,910,033 B2 | * | 6/2005 | Rosenblum ....................... 707/3 |
| 6,937,597 B1 | | 8/2005 | Rosenberg et al. |
| 6,983,326 B1 | | 1/2006 | Vigue et al. |
| 7,043,550 B2 | | 5/2006 | Knop et al. |
| 7,117,267 B2 | * | 10/2006 | Bavadekar ..................... 709/230 |
| 7,152,094 B1 | | 12/2006 | Jannu et al. |
| 2002/0042830 A1 | * | 4/2002 | Bose et al. ..................... 709/230 |
| 2002/0059204 A1 | | 5/2002 | Harris |
| 2002/0147611 A1 | * | 10/2002 | Greene et al. ..................... 705/1 |
| 2003/0090998 A1 | | 5/2003 | Lee et al. |

(Continued)

OTHER PUBLICATIONS

Bhola et al. "Exactly-once Delivery in a Content-based Publish-Subscribe System." Proceedings of the International Conference on Dependable Systems and Networks. Jun. 23-26, 2002.*

(Continued)

*Primary Examiner* — Don Wong
*Assistant Examiner* — Tuan-Khanh Phan
(74) *Attorney, Agent, or Firm* — Yee & Associates, P.C.; David A. Mims, Jr.

(57) ABSTRACT

A variety of techniques are disclosed for efficient liveness monitoring in a reliable publish/subscribe multicast system having at least one broker and at least one subscriber, by: at the broker, sending (310) a status request message to the subscriber, and at the subscriber, sending (350) a status response message to the broker to indicate liveness. Status responses by subscribers may be suppressed when at least a chosen minimum number (>=1) of subscribers send a response. This suppression (320-340) uses a system of "response claim" messages and random back-off timers. These provide the advantage that the efficiency of network usage is improved by reducing the number of unwanted packets that are sent.

50 Claims, 5 Drawing Sheets

U.S. PATENT DOCUMENTS

2003/0135556 A1* 7/2003 Holdsworth ................. 709/206
2004/0250283 A1* 12/2004 Duigenan et al. ............... 725/60

OTHER PUBLICATIONS

Huang et al. "Publish/subscribe in a Mobile Environment." ACM. 2001.*

Sun, Qixiang. Reliable Multicast for Publish/Subscribe Systems. May 2000. Massachusetts Institute of Technology.*

Pascal Felber et al., "Failure Detectors as First Class Objects" 1999 IEEE Computer Society Press, *Proceedings of the International Symposium on Distributed Objects and Applications*, pp. 1-10.

* cited by examiner

LIVENESS MONITORING IN A PUBLISH/SUBSCRIBE MESSAGING SYSTEM

This patent application is related to a US patent application entitled "Liveness Monitoring in a Publish/Subscribe Messaging System", Ser. No. 10/714,049 filed on Nov. 13, 2003, which is incorporated herein by reference.

FIELD OF THE INVENTION

This invention relates to brokered multicast publish/subscribe messaging systems.

BACKGROUND OF THE INVENTION

Publish and Subscribe is an effective way of disseminating information to multiple users. Publish/Subscribe applications can help to enormously simplify the task of getting business messages and transactions to a wide, dynamic and potentially large audience in a timely manner.

In a publish/subscribe messaging system subscribers register their interest in one or more topics. The broker performs a match of publications to interested subscribers and sends a copy of each publication to the appropriate subscribers. The stream of publication messages is divided into a sequence of packets of sizes that are optimal for the transmission medium being used. To maximise the efficiency of the network utilisation in such a publish/subscribe system it is preferable to multicast the packets that contain the messages which are to be sent to a number of subscribers. Where there is a large number of subscribers for a given topic the network efficiency gain provided by multicast is greater. The broker performs the role of multicast transmitter and the subscribers each perform the role of multicast receiver.

In a reliable multicast publish/subscribe system, subscribers request retransmission of any packet that is not delivered. They do this by detecting gaps in the delivery sequence. When a subscriber detects a missing packet it requests retransmission by sending a "negative acknowledgement" or NACK. To avoid the generation of a storm of NACKs when a packet goes missing, the subscribers can use a NACK suppression mechanism, which operates by each subscriber setting a random back-off timer and sending a multicast NACK packet on expiry of the timer. If a subscriber sees another subscriber's NACK packet before its own timer expires, it cancels the timer.

However, this approach has the disadvantage(s) that the only feedback that the broker has is the receipt of NACK packets when one or more subscribers fail to receive a packet and the notification during orderly subscriber termination that a subscriber no longer wishes to receive publications matching a particular set of topics. The broker has no guarantee that either of these forms of feedback will be received; no packets may be being dropped and subscribers could fail or disconnect unintentionally. Accordingly, the broker has no knowledge of the current status of the subscribers and is therefore obliged to keep multicasting publications even when no subscribers are actually running, thus reducing the efficiency of such a system.

A need therefore exists for efficient liveness monitoring in a reliable multicast system wherein the abovementioned disadvantage(s) may be alleviated.

STATEMENT OF INVENTION

In accordance with a first aspect of the present invention there is provided a publish/subscribe messaging system, comprising: at least one broker and at least one subscriber, the broker having means for sending a status request message to the subscriber, and means for receiving an indication of liveness of the subscriber.

Preferably the subscriber has means for sending a status response message to the broker to indicate liveness.

In one embodiment, the means for receiving comprises means for listening on a multicast channel and for determining an indication of non-liveness from failure to receive a response from the subscriber.

For example, the broker may listen on the multicast channel and may hear a subscriber "claiming" that it will respond to the broker without any explicit response to the broker being necessary (see later).

Preferably the means for sending a status response message to the broker comprises means for suppressing sending of the status response message if at least another subscriber sends a status response message.

In a preferred embodiment, the means for suppressing sending of the status response message comprises: means for setting a timer upon receipt of a status request message from the broker; means for sending, on expiry of the timer, a multicast message claiming response to the broker; means for cancelling the timer and discarding the status request message if the subscriber receives a message claiming response from another subscriber; means for sending the status response message to the broker following sending a message claiming response.

In one embodiment, the means for suppressing sending of the status response message comprises: means for setting a timer upon receipt of a status request message from the broker; means for sending, on expiry of the timer, a status response message to the broker; and means for cancelling the timer and discarding the status request message if the subscriber sees a status response message from another subscriber.

Preferably, the broker further comprises means for re-sending the status request message if it does not receive a response thereto.

In one embodiment, the means for suppressing sending of the status response message is arranged to suppress sending of the status response message if at least a desired plurality of other subscribers send a status response message.

In this embodiment, the means for suppressing sending of the status response message may comprise: means for setting a timer upon receipt of a status request message from the broker, the status request message containing a parameter representative of the desired plurality of other subscribers; means for sending, on expiry of the timer, a multicast message claiming response to the broker; means for cancelling the timer and discarding the status request message if the subscriber receives messages claiming response from the desired plurality of other subscribers; means for sending the status response message to the broker following sending a message claiming response.

In one embodiment the timer has a random duration.

In one embodiment at least one of the subscribers is arranged to maintain an active connection to the broker established during registration, and to use the active connection to indicate liveness to the broker.

In one embodiment the means for suppressing sending of the status response message comprises: means for checking, upon receipt of a status request message from the broker, whether the subscriber has an active connection to the broker and if so performing one of A) and B): A) sending a multicast response claim message, and sending a status response message to the broker via the active connection, and B) setting a timer and then sending a multicast response claim and a status response message to the broker via the active connection; and means for, following sending of a multicast response message, establishing an active connection to the broker if not already established and sending the status response message to the broker via the active connection.

In one embodiment the means for suppressing sending of the status response message comprises: means for checking, upon receipt of a status request message from the broker, whether the subscriber has an active connection to the broker and if so performing one of A) and B): A) sending a status response message to the broker via the active connection, and B) setting a timer and then sending a status response message to the broker via the active connection; and means for establishing an active connection to the broker if not already established and sending the status response message to the broker via the active connection.

In one embodiment, the broker is arranged to designate as a primary subscriber the first subscriber to register interest in a topic, and to maintain an active connection to the primary subscriber for sending directly to the primary subscriber a status request message, and in the event of failure of the primary subscriber to send a status request message to at least one other subscriber and to designate as a new primary subscriber the at least one of the other subscribers whose indication of liveness is next first received.

In one embodiment, the active connection is a TCP/IP connection.

In one embodiment, the status request message is piggy-backed onto another multicast publication message.

In one embodiment, the indication of liveness is sent over one of: a UDP connection, and a TCP connection.

In one embodiment, the connection over which the indication of liveness is sent is arranged to escalate autonomously from a UDP connection to a TCP connection in the event of no responses being received by the broker within a chosen time period.

In accordance with a second aspect of the present invention there is provided a method for liveness monitoring in a publish/subscribe messaging system having at least one broker and at least one subscriber, the method comprising: at the broker, sending a status request message to the subscriber, and receiving an indication of liveness of the subscriber.

In accordance with a third aspect of the invention, there is provided a method of liveness monitoring in a publish/subscribe messaging system in accordance with claim 28.

It will of course be appreciated that the invention may be implemented in software.

BRIEF DESCRIPTION OF THE DRAWING(S)

Embodiments of the present invention will now be described, by way of example only, and with reference to the following drawings.

DESCRIPTION OF PREFERRED EMBODIMENTS

Figure 1:
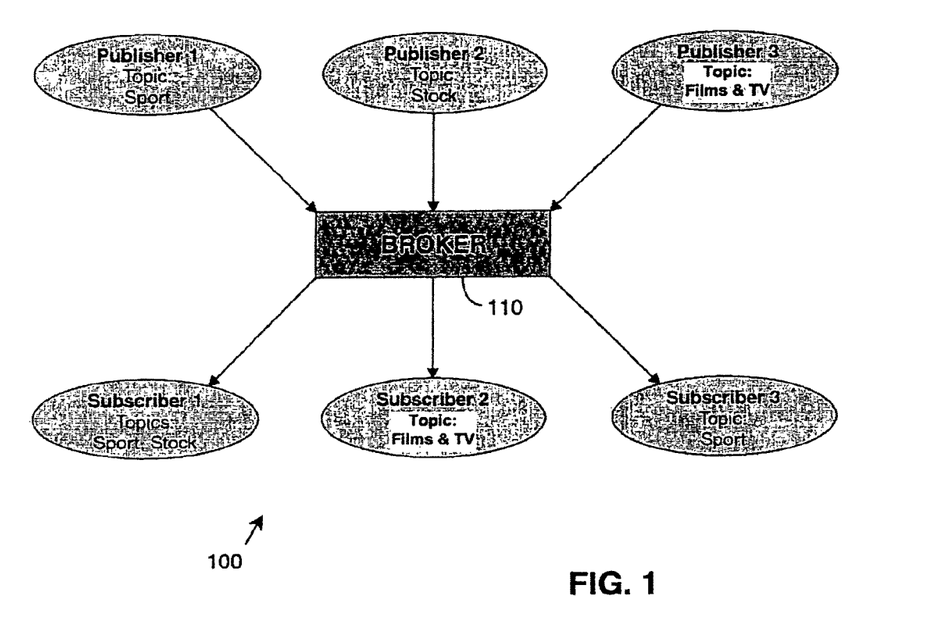
FIG. 1 shows a block schematic diagram of a publish/subscribe messaging system in which embodiments of the present invention may be used.

FIG. 1 shows a brokered publish/subscribe multicast messaging system 100 in which a broker 110 brokers sending of multicast messages from Publisher 1 (publishing information on, for example, the topic of Sport), Publisher 2 (publishing information on, for example, the topic of Stock) and Publisher 3 (publishing information on, for example, the topic of Films & Television) to Subscriber 1 (subscribing to information on, for example, the topics of Sport and Stock), Subscriber 2 (subscribing to information on, for example, the topic of Films & Television) and Subscriber 3 (subscribing to information on, for example, the topic of Sport).

Figure 2:
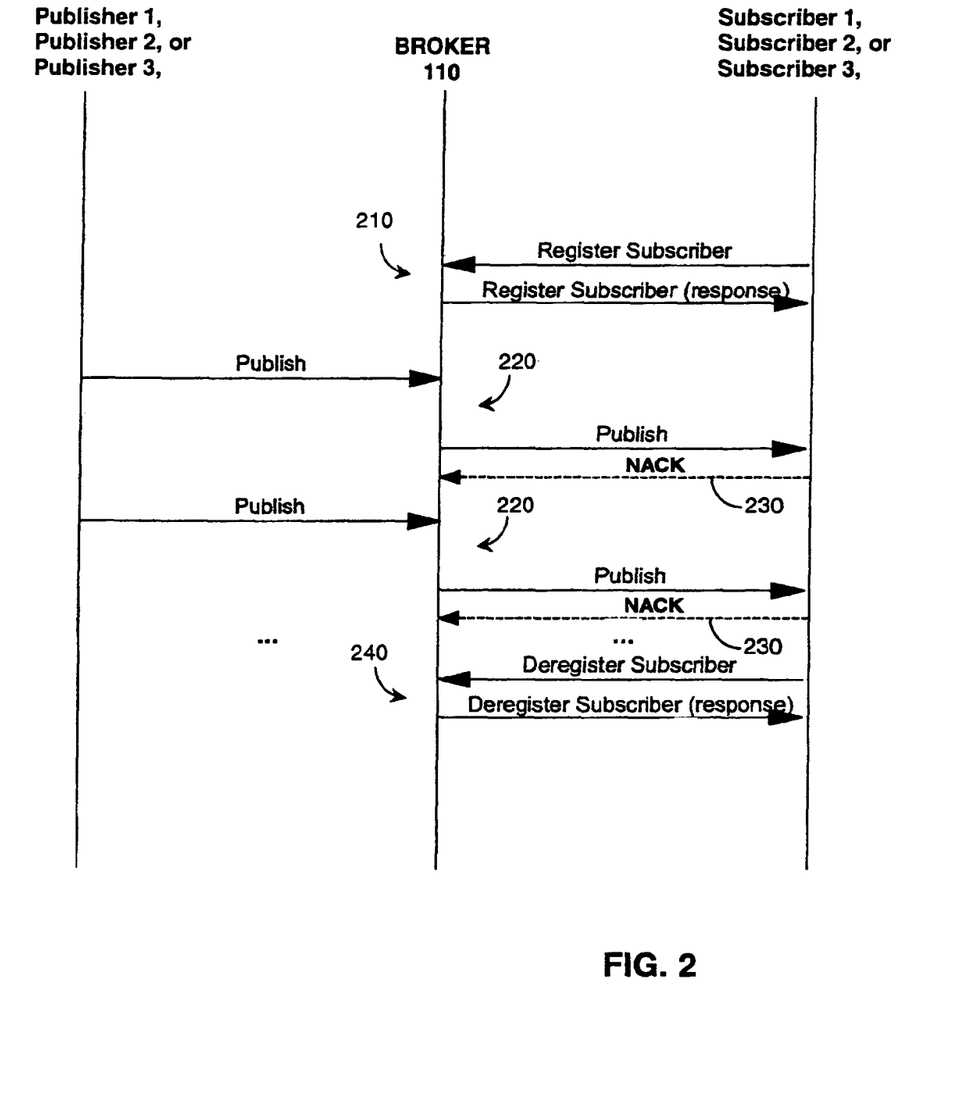
FIG. 2 shows a schematic diagram depicting message flows between components of the system of FIG. 1.

As shown in FIG. 2 at 210, Subscriber 1, Subscriber 2 and Subscriber 3 each send a message to the broker 110 to register the respective subscriber with the broker 110, and in response thereto the relevant subscriber receives a message from the broker 110 confirming registration. Thereafter, as shown at 220, each publisher publishes its information to the broker 110, and the broker 110 publishes the information to the relevant subscriber(s) that have registered with the broker to subscribe to such information.

As referred to above, if a subscriber detects a missing packet it requests retransmission by sending a "negative acknowledgement" or NACK 230. To avoid the generation of a storm of NACKs when a packet goes missing, the subscribers can use a NACK suppression mechanism, which operates by each subscriber setting a random back-off timer and sending a multicast NACK packet on expiry of the timer. If a subscriber sees another subscriber's NACK packet before its own timer expires, it cancels the timer.

Finally, as shown at 240, Subscriber 1, Subscriber 2 and Subscriber 3 may each send a message to the broker 110 to deregister the respective subscriber from the broker 110, and in response thereto the relevant subscriber receives a message from the broker 110 confirming deregistration.

In the system 100 it is desired, to improve network utilisation and security, to avoid sending multicast packets from the broker when there are no active subscribers. The broker therefore needs to keep track of the set of active subscribers. It is not sufficient to rely on the subscribers unregistering when they are deactivated, because a subscriber may be accidentally disconnected or fail and not get a chance to deregister.

Furthermore, it is important for each subscriber to know if the broker fails and is restarted, so that subscriptions can be re-registered, fresh security keys exchanged and packet sequence numbers can be reset.

The following conditions together preferably indicate the liveness of the system:

Condition 1): Each subscriber knows that the broker is still active.

This first condition can be evaluated by the in-band receipt of normal data, or periodic "heartbeats" sent by the broker in periods when there is no data to transmit. Each receiver knows what this period is, and if no data or heartbeat arrives from the transmitter within a time related to this period, the receiver takes this as an indication that the transmitter is dead. This is a widely accepted practice, used in channels of IBM's MQSeries ('IBM' and 'MQSeries' are registered trademarks of IBM Corporation) products and need not be described in further detail.

Condition 2): The broker knows that there is at least one active subscriber.

To evaluate this second condition the broker needs to periodically receive an indication from at least one subscriber. This can either be prompted by the subscribers or requested by the broker. In the cases where the broker requests status information, the requests can be either be sent in-band or out-of-band. The advantage of sending such requests out-of-band is that this presents less load on the data channel and on the subscriber, which does not need to parse to identify the status request packets within the data stream. Requests can be piggybacked onto other in-band traffic. The disadvantage of sending requests out-of-band is that it does not test the data channel and so does not extend to cover the following third condition.

Condition 3): The broker knows that at least one active subscriber can receive multicast packets.

To evaluate this third condition, the broker needs to send data over the multicast channel, to prove that the multicast channel is operating correctly and that subscribers can receive packets from it, and to receive some feedback from the subscribers.

It is therefore desirable to find a cost-effective and scalable means to query subscriber liveness in a reliable multicast system.

Following are four techniques that can be used to solve the above problem.

Technique #1

When there is data to be sent and there are packet losses, some subscribers will be sending NACK packets. In these conditions the broker can ascertain that there is at least one active subscriber.

When there is no data to be sent, or any data transmission is lossless, there will be no NACK packets. It would not be sufficient for the subscribers to use a timeout to trigger the sending of status packets to the broker because this does not prove that the multicast channel is working. The broker therefore needs to send data over the multicast channel, and to receive some feedback from the subscribers. In order to have reliable communication of the feedback, responses can be unicast over a TCP/IP (Transmission Command Protocol/ Internet Protocol) connection rather than through the multicast fabric. Alternatively, the responses can be sent using UDP/IP (User Datagram Protocol/Internet Protocol) which is a less reliable point to point protocol. The lower reliability may lead to more requests being generated by the broker; on the other hand, it avoids TCP/IP connection set-up cost. The choice of protocol could therefore be made dependent on the loss rate and number of subscribers and made as a result of dynamic evaluation of these parameters, thereby providing self-optimising characteristics. The broker can escalate from UDP/IP to TCP/IP in the event of no responses being received within an acceptable time period. It would alternatively be possible in principle to use the reliable multicast protocol to achieve this, but since there is only one intended recipient it is more efficient to use a unicast protocol—hence TCP/IP or UDP/IP.

As a result, the broker may periodically inject "status request" packets into the datastream (as shown at step 310 of FIG. 3), to which the subscribers need to respond. These packets may be piggybacked onto other packets relating to multicast publication messages. More accurately, the broker needs at least one subscriber to respond by sending a "status response". For maximum efficiency, it is preferable to minimise the number of subscribers who send status response packets in response to a status request packet.

Figure 3:
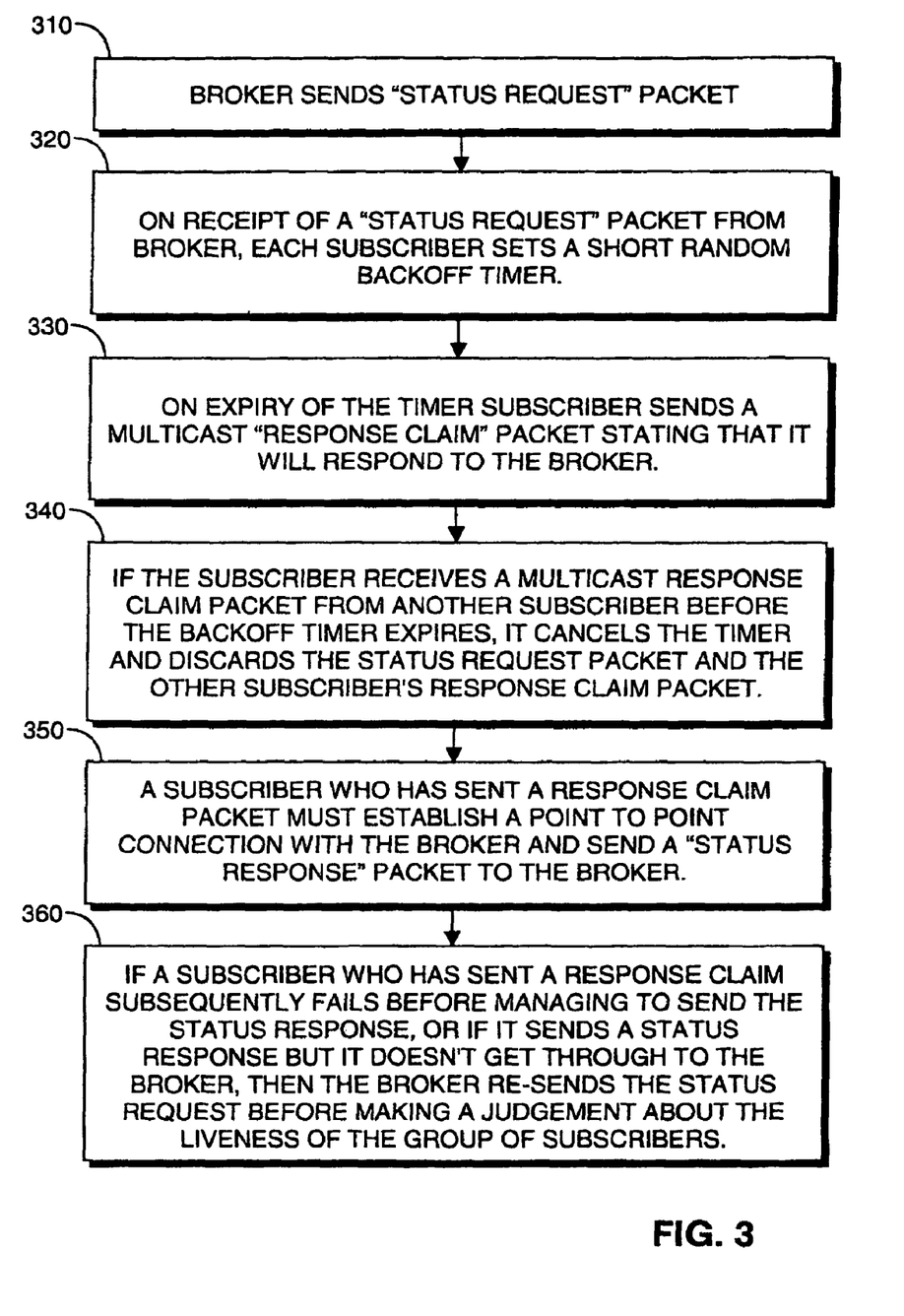
FIG. 3 shows a flow diagram depicting method steps of a first technique for liveness monitoring in accordance with an embodiment of the present invention.

If status packets are transmitted over the multicast fabric (i.e., are injected into the normal dataflow) then they are received (almost) simultaneously by all subscribers. To minimise the number of subscribers who respond to the status packet, the subscribers behave as follows:

Step 320 On receipt of a "status request" packet from the broker, each subscriber sets a short random duration backoff timer.

Step 330 On expiry of the timer a subscriber sends a multicast packet stating that it will respond to the broker, here called a "response claim" packet.

Step 340 If the subscriber receives a multicast response claim packet from another subscriber before the backoff timer expires, it cancels the timer and discards the status request packet and the other subscriber's response claim packet.

Step 350 A subscriber who has sent a response claim packet must establish a point to point connection with the broker and send a "status response" packet to the broker.

The broker may receive multiple status response packets, but the number should be minimised by the above algorithm.

Step 360 If a subscriber who has sent a response claim subsequently fails before managing to send the status response, or if it sends a status response but it doesn't get through to the broker, then the broker may receive no response to the status request. In this case the broker should re-send the status request before making a judgement about the state (i.e., the liveness) of the group of subscribers.

Technique #2

A second technique for liveness monitoring is similar to technique #1 described above, but with the addition of a mechanism to minimise the need for the broker to re-send status requests. This modification is based on the intent of a number of subscribers to respond, providing a degree of tolerance to subsequent subscriber failures.

The broker may optionally include a response quota in the "status request" packet, which includes a "number of replies (nr)" parameter (as shown at step 410 of FIG. 4, which will be described in more detail below). A subscriber with a pending backoff timer cancels it and discards the response only if it receives at least nr multicast response claim packets from other subscribers before the backoff timer expires. This will guarantee that at least nr subscribers will try to respond to the broker, reducing the risk that the broker will have to re-send the status request.

Despite the intention of nr subscribers to respond, the broker will in general only need to handle less than nr incoming TCP connections or nr incoming UDP datagrams. This is because the broker, upon first successful status response reception, immediately sends a "response received" packet, over the same channel used to send the "status request" packet. Upon "response received" packet reception, the subscribers with pending timers cancel them and discard their status packet.

The broker can escalate from technique #1 to technique #2 (with a response quota greater than 1) in the event of no responses being received within an acceptable time period.

Figure 4:
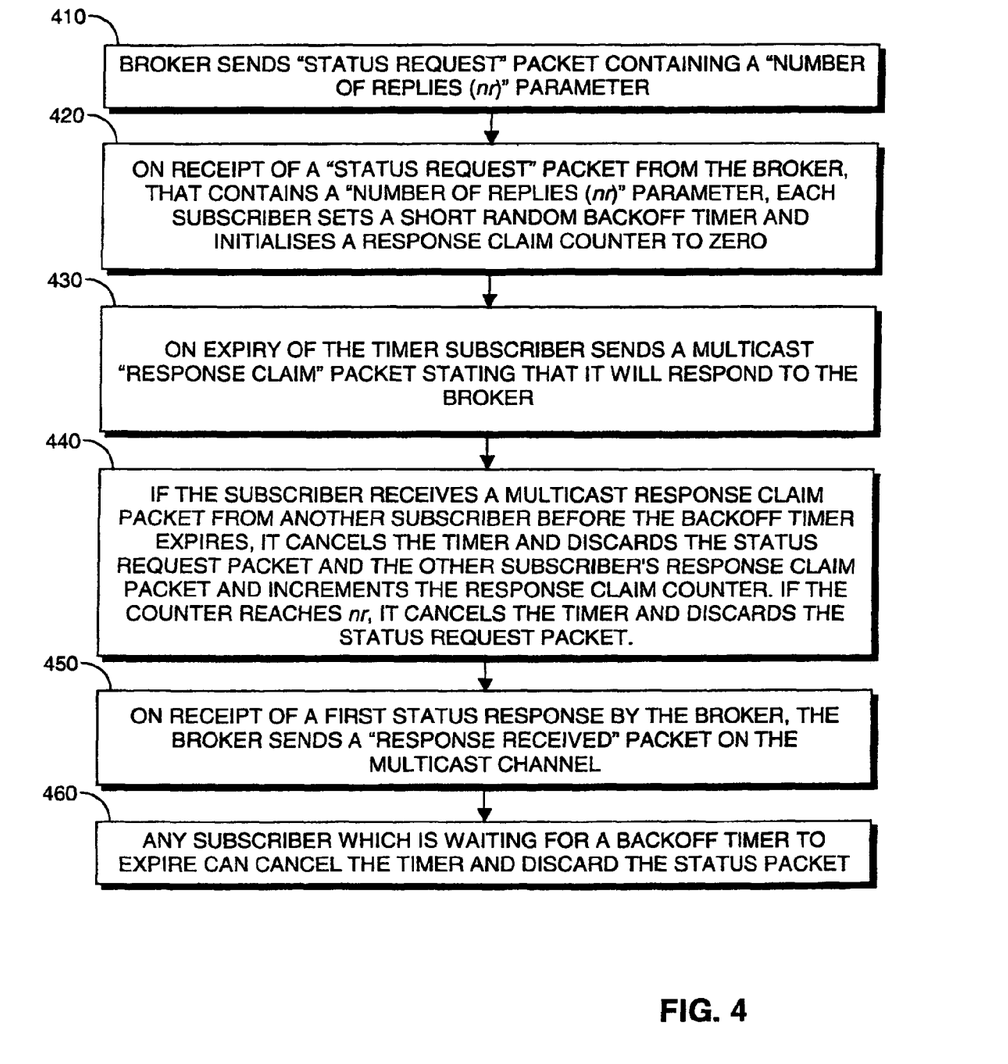
FIG. 4 shows a flow diagram depicting method steps of a second technique for liveness monitoring in accordance with an embodiment of the present invention.

As shown in FIG. 4:

Step 420 On receipt of a "status request" packet from the broker, that contains a "number of replies (nr)" parameter, each subscriber sets a short random backoff timer and initialises a response claim counter to zero.

Step 430 On expiry of the timer a subscriber sends a multicast packet stating that it will respond to the broker, called a "response claim" packet.

Step 440 If the subscriber receives a multicast response claim packet from another subscriber before the backoff timer expires, it discards the other subscriber's response claim packet and increments the response claim counter. If the counter reaches nr, it cancels the timer and discards the status request packet.

Step 440 A subscriber who has sent a response claim packet sets a short backoff timer after which it will establish a point to point connection with the broker and send a "status response" packet to the broker.

Step 450 On receipt of a first status response by the broker, the broker sends a "response received" packet on the multicast channel.

Step 460 Any subscriber which is waiting for a backoff timer to expire can cancel the timer and discard the status packet.

If a subscriber who has sent a response claim subsequently fails before managing to send the status response, or if it sends a status response but it doesn't get through to the broker, then the broker should still receive a response from an alternative responding subscriber.

The broker may still receive multiple status response packets, but the number should be minimised (further) by the above algorithm.

Technique #3

A third technique provides a performance optimisation in the case where a TCP/IP connection is to be used for the subscriber-to-broker response channel. This technique can be used in combination with either of the techniques #1 and #2 described above.

During registration of a subscriber a TCP/IP connection is established between the subscriber and the broker. Once subscription (including key exchange, etc.) is complete the TCP/IP connection could be disconnected. This is beneficial for scalability. However, if at least some of the TCP/IP connections are maintained beyond the end of the subscription protocol, then they can be re-used for status response traffic, avoiding the overhead of re-establishing a TCP/IP connection, which would be considerable (e.g., 7 packets to set up the connection compared to one status packet to be sent). Each TCP/IP connection can be associated with an idle timer and can be disconnected on expiry of the idle timer. Whenever a connection is used (for subscription, key exchange or status traffic) the idle timer is reset.

Figure 5:
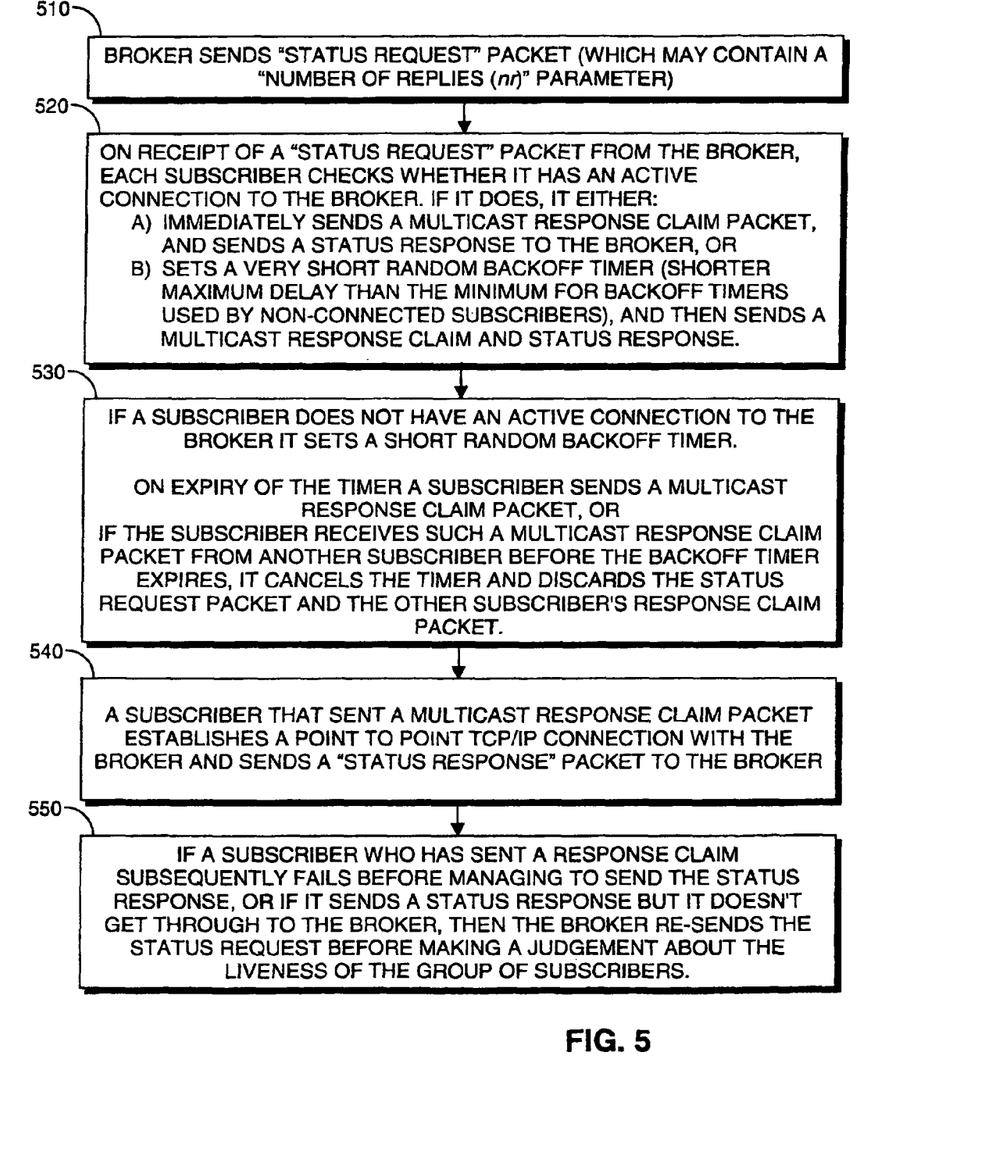
FIG. 5 shows a flow diagram depicting method steps of a third technique for liveness monitoring in accordance with an embodiment of the present invention.

Referring now to FIG. 5, as in technique #1 or technique #2 described above the broker sends a "status request" packet (step 510, which may contain a "number of replies (nr)" parameter). The inclusion of the nr parameter would require the same earlier-described counter logic, which for simplicity is not included in the description that follows. The subscriber behaviour is modified as follows:

Step 520 On receipt of a "status request" packet from the broker, each subscriber checks whether it has an active connection to the broker. If it does, it either:

A) immediately sends a multicast response claim packet, and sends a status response to the broker, or B) sets a very short random backoff timer (shorter maximum delay than the minimum for backoff timers used by non-connected subscribers), and then sends a multicast response claim and status response.

Option A) is simple but may result in more status response packets being sent to the broker; option B) should reduce this number of packets at the expense of some additional complexity in the subscriber code).

Step 530 If a subscriber does not have an active connection to the broker it sets a short random backoff timer. On expiry of the timer a subscriber sends a multicast response claim packet. If the subscriber receives such a multicast response claim packet from another subscriber before the backoff timer expires, it cancels the timer and discards the status request packet and the other subscriber's response claim packet.

Step 540 A subscriber that sent a multicast response claim packet establishes a point to point TCP/IP connection with the broker and sends a "status response" packet to the broker. This TCP/IP connection is left open for future status reports (from this moment on, this subscriber will know it has an active connection to the broker, and will respond more rapidly, according to the rules described above).

The broker may receive multiple status response packets, but the number should be minimised by the above algorithm.

Step 550 If a subscriber who has sent a response claim subsequently fails before managing to send the status response, or if it sends a status response but it doesn't get through to the broker, then the broker may receive no response to the status request. In this case the broker should re-send the status request before making a judgement about the liveness of the group of subscribers.

Technique #4

A fourth technique, alternative to technique #3 described above, contains a performance modification which is that the broker notes the identity of the first subscriber to register interest in a topic. The broker maintains the TCP/IP connection to this subscriber. Rather than multicasting the status request packet, the broker sends it on the point to point TCP/IP connection directly to that designated subscriber.

If the designated subscriber fails then the broker will detect this because the TCP/IP connection will be broken. In this case the broker can revert to the multicast request scheme(s) above, and establish a new designated subscriber, as the first subscriber to respond to the status request.

It will be understood that in any of the above techniques it would be possible to use a custom reliable point to point protocol in place of UDP/IP or TCP/IP for the response channel from each subscriber to the broker.

It will also be understood that the broker may be arranged to be a listener in all multicast groups, so that it hears the 'claim' from subscribers, without any other explicit subscriber/broker response being necessary.

It will be appreciated that the method described above for liveness monitoring in a publish/subscribe messaging system may be carried out in software running on a processor (not shown), and that the software may be provided as a computer program element carried on any suitable data carrier (also not shown) such as a magnetic or optical computer disc.

In summary, it will be understood that the techniques for efficient liveness monitoring in a reliable multicast system described above provides the advantage of improving the efficiency of network usage by reducing the number of unwanted packets that are sent.

What is claimed is:

1. A publish/subscribe messaging system, comprising:
at least one broker and at least one subscriber, wherein the at least one broker has means for sending a status request message to the at least one subscriber,
means, responsive to a particular subscriber receiving the status request message from the at least one broker, for setting a timer for the particular subscriber of the at least one subscriber, and
means, responsive to the timer expiring, for sending a multicast message claiming response to the at least one broker from the particular subscriber of the at least one subscriber.

2. The publish/subscribe messaging system of claim 1, further comprising:
    means for sending a status response message from the particular subscriber to the at least one broker, wherein the status response message is an indication of liveness of the at least one subscriber.

3. The publish/subscribe messaging system of claim 1, further comprising:
    means for listening on a multicast channel by the at least one broker, and
    means for determining an indication of non-liveness from failure to receive a response from the at least one subscriber.

4. The publish/subscribe messaging system of claim 2, wherein the means for sending the status response message from the particular subscriber to the at least one broker further comprises:
    means, responsive to the particular subscriber sending the status response message, for suppressing sending of a separate status response message from another subscriber of the at least one subscriber.

5. The publish/subscribe messaging system of claim 4, wherein sending the status response message is responsive to sending the multicast message claiming response, and wherein the means for suppressing further comprises:
    means, responsive to the another subscriber of the least one subscriber receiving the multicast message claiming response, for cancelling the timer and discarding the status request message for the another subscriber.

6. The publish/subscribe messaging system of claim 5, further comprising:
    means, responsive to the at least one broker failing to receive the multicast message claiming response from the at least one subscriber, for re-sending the status request message.

7. The publish/subscribe messaging system of claim 4, wherein the means for suppressing further comprises:
    means, responsive to a desired plurality of subscribers of the at least one subscriber sending the status response message, for suppressing sending of the separate status response message from the another subscriber.

8. The publish/subscribe messaging system of claim 7, wherein the status request message comprises a parameter representative of the desired plurality of subscribers, wherein sending the status response message is responsive to sending the multicast message claiming response, and wherein the means for suppressing sending of the separate status response message from the another subscriber further comprises:
    means, responsive to the another particular subscriber receiving the multicast message claiming response from the desired plurality of subscribers, for cancelling the timer and discarding the status request message for the another particular subscriber.

9. The publish/subscribe messaging system of claim 1, wherein the timer has a random duration.

10. The publish/subscribe messaging system of claim 1, further comprising:
    means for maintaining an active connection between the particular subscriber and the at least one broker, wherein the active connection is established during registration, and
    means for indicating liveness to the at least one broker using the active connection.

11. The publish/subscribe messaging system of claim 10, further comprising:
    means for sending a status response message from the particular subscriber to the at least one broker to indicate the liveness,
    means, responsive to the particular subscriber sending the status response message, for suppressing sending of a separate status response message from another subscriber, and wherein the means for suppressing further comprises:
    means, responsive to determining that the particular subscriber has the active connection to the at least one broker, for performing one of sending the status response message to the at least one broker via the active connection, and sending the multicast message claiming response and the status response message to the at least one broker via the active connection upon expiry of the timer.

12. The publish/subscribe messaging system according to claim 1, wherein the at least one broker is arranged to designate a first subscriber to register interest in a topic as a primary subscriber, and to maintain an active connection to the primary subscriber for sending the status request message directly to the primary subscriber to designate a different subscriber as a new primary subscriber in response to a failure of the primary subscriber to send an indication of liveness and in response to the different subscriber sending the indication of liveness.

13. The publish/subscribe messaging system of claim 10, wherein the active connection is a transmission control protocol/internet protocol connection.

14. The publish/subscribe messaging system of claim 1, wherein the status request message is piggybacked onto another multicast publication message.

15. The publish/subscribe messaging system of claim 2, wherein the indication of liveness is sent over one of a user datagram protocol connection and a transmission control protocol connection.

16. The publish/subscribe messaging system of claim 15, wherein a connection over which the indication of liveness is sent is arranged to escalate autonomously from the user datagram protocol connection to the transmission control protocol connection in response to an absence of responses to the at least one broker within a chosen time period.

17. A method for liveness monitoring in a publish/subscribe messaging system having at least one broker and at least one subscriber, the method comprising:
    sending a status request message from the at least one broker to the at least one subscriber,
    responsive to a particular subscriber receiving the status request message from the at least one broker, setting a timer for the particular subscriber of the at least one subscriber, and
    responsive to the timer expiring, sending a multicast message claiming response to the at least one broker from the particular subscriber of the at least one subscriber.

18. The method of claim 17, further comprising:
    sending a status response message from the particular subscriber to the at least one broker, wherein the status response message is an indication of liveness of the at least one subscriber.

19. The method of claim 17, further comprising:
    listening on a multicast channel by the at least one broker, and
    determining an indication of non-liveness from failure to receive a response from the at least one subscriber.

20. The method of claim 18, wherein sending the status response message from the particular subscriber to the at least one broker further comprises:
responsive to the particular subscriber sending the status response message, suppressing sending of a separate status response message from another subscriber of the at least one subscriber.

21. The method of claim 20, wherein sending the status response message is responsive to sending the multicast message claiming response, and wherein the suppressing further comprises:
responsive to the another subscriber of the least one subscriber receiving the multicast message claiming response, cancelling the timer and discarding the status request message for the another subscriber.

22. The method of claim 21, further comprising:
responsive to the at least one broker failing to receive the multicast message claiming response from the at least one subscriber, re-sending the status request message.

23. The method of claim 20, wherein the suppressing further comprises:
responsive to a desired plurality of subscribers of the at least one subscriber sending the status response message, suppressing sending of the separate status response message from the another subscriber.

24. The method of claim 23, wherein the status request message comprises a parameter representative of the desired plurality of subscribers, wherein sending the status response message is responsive to sending the multicast message claiming response, and wherein suppressing sending of the separate status response message from the another subscriber further comprises:
responsive to the another particular subscriber receiving the multicast message claiming response from the desired plurality of subscribers, cancelling the timer and discarding the status request message for the another particular subscriber.

25. The method of claim 17, wherein the timer has a random duration.

26. The method of claim 17, further comprising:
maintaining an active connection between the particular subscriber and the at least one broker, wherein the active connection is established during registration,
indicating liveness to the at least one broker using the active connection.

27. The method of claim 26, further comprising:
sending a status response message from the particular subscriber to the at least one broker to indicate the liveness,
responsive to the particular subscriber sending the status response message, suppressing sending of a separate status response message from another subscriber of the at least one subscriber, and wherein the suppressing further comprises:
responsive to determining that the particular subscriber has the active connection to the at least one broker, performing one of sending the status response message to the at least one broker via the active connection, and sending the multicast message claiming response and the status response message to the at least one broker via the active connection upon expiry of the timer.

28. The method of claim 17, further comprising:
a first subscriber of the at least one subscriber to register interest in a topic as a primary subscriber, maintaining an active connection to the primary subscriber for sending the status request message directly to the primary subscriber, and
responsive to a failure of the primary subscriber to send an indication of liveness and responsive to a different subscriber of the at least one subscriber sending the indication of liveness, designating the different subscriber as a new primary subscriber.

29. The method of claim 26, wherein the active connection is a transmission control protocol/internet protocol connection.

30. The method of claim 17, wherein the status request message is piggybacked onto another multicast publication message.

31. The method of claim 18, wherein the indication of liveness is sent over one of a user datagram protocol connection and a transmission control protocol connection.

32. The method of claim 31, wherein a connection over which the indication of liveness is sent escalates autonomously from the user datagram protocol connection to the transmission control protocol connection in response to an absence of responses to the at least one broker within a chosen time period.

33. A system for indicating liveness to a broker in a multicast publish/subscribe messaging system comprising the broker and a plurality of subscribers, the system comprising:
means, responsive to a particular subscriber receiving a status request message from the broker, for setting a timer for each subscriber in the plurality of subscribers, and
means, responsive to the timer expiring, for sending a multicast message claiming response to the broker from the particular subscriber in the plurality of subscribers.

34. The system of claim 33, further comprising:
means for sending a status response message from the particular subscriber to the broker, wherein the status response message is an indication of liveness of the plurality of subscribers.

35. The system of claim 34, further comprising:
means, responsive to the particular subscriber sending the status response message, for suppressing sending of a separate status response message from another subscriber in the plurality of subscribers.

36. The system of claim 35, wherein sending the status response message is responsive to sending the multicast message claiming response, and wherein the means for suppressing further comprises:
means, responsive to the another subscriber in the plurality of subscribers receiving the multicast message claiming response, for cancelling the timer and discarding the status request message for the another subscriber.

37. The system of claim 35, wherein the means for suppressing further comprises:
means, responsive to a desired plurality of subscribers of the at least one subscriber sending the status response message, for suppressing sending of the separate status response message from the another subscriber.

38. The system of claim 37, wherein the status request message comprises a parameter representative of the desired plurality of subscribers, wherein sending the status response message is responsive to sending the multicast message claiming response, and wherein the means for suppressing sending of the separate status response message from the another subscriber further comprises:
means, responsive to the another particular subscriber receiving the multicast message claiming response from the desired plurality of subscribers, for cancelling the timer and discarding the status request message for the another particular subscriber.

39. The system of claim 33, further comprising:
means for maintaining an active connection between the particular subscriber and the broker, wherein the active connection is established during registration and means for indicating liveness to the broker using the active connection.

40. The system of claim 33, further comprising:
means for sending a status response message from the particular subscriber to the broker to indicate liveness,
means, responsive to the particular subscriber sending the status response message, for suppressing sending of a separate status response message from another subscriber, and wherein the means for suppressing further comprises:
means, responsive to determining that the particular subscriber has an active connection to the broker, for performing one of sending the status response message to the broker via the active connection, and sending the multicast message claiming response and the status response message to the broker via the active connection upon expiry of the timer.

41. A method for indicating liveness to a broker in a multicast publish/subscribe messaging system comprising the broker and a plurality of subscribers, the method comprising:
responsive to each subscriber receiving a status request message from the broker, setting a separate timer for each subscriber in the plurality of subscribers, and
responsive to a timer of a particular subscriber in the plurality of subscribers expiring, sending a multicast message claiming response to the broker from the particular subscriber in the plurality of subscribers.

42. The method of claim 41, further comprising:
sending a status response message from the particular subscriber to the broker, wherein the status response message is an indication of liveness of the plurality of subscribers.

43. The method of claim 42, comprising:
responsive to the particular subscriber sending the status response message, suppressing sending of a separate status response message from another subscriber in the plurality of subscribers.

44. The method of claim 43, wherein sending the status response message is responsive to sending the multicast message claiming response, and wherein the suppressing further comprises:
responsive to the another subscriber receiving the multicast message claiming response, cancelling the timer of the particular subscriber and discarding the status request message for the another subscriber.

45. The method of claim 43, wherein the suppressing further comprises:
responsive to a desired plurality of subscribers of the plurality of subscribers sending the status response message, suppressing sending of the separate status response message from the another subscriber.

46. The method of claim 45, wherein the status request message comprises a parameter representative of the desired plurality of subscribers, wherein sending the status response message is responsive to sending the multicast message claiming response, and wherein suppressing sending of the separate status response message from the another subscriber further comprises:
responsive to the another particular subscriber receiving the multicast message claiming response from the desired plurality of subscribers, cancelling the timer of the particular subscriber and discarding the status request message for the another particular subscriber.

47. The method of claim 41, further comprising:
maintaining an active connection between the particular subscriber and the broker, wherein the active connection is established during registration, and
indicating liveness to the broker using the active connection.

48. The method of claim 47, further comprising:
sending a status response message from the particular subscriber to the broker to indicate the liveness, responsive to the particular subscriber sending the status response message, suppressing sending of a separate status response message from another subscriber, and wherein the suppressing further comprises:
responsive to determining that the particular subscriber has the active connection to the broker, performing one of sending the status response message to the broker via the active connection, and sending the multicast message claiming response and the status response message to the broker via the active connection upon expiry of the timer.

49. The method of claim 17, further comprising:
responsive to sending the multicast message claiming response and responsive to an absence of an active connection between the particular subscriber and the at least one broker, establishing the active connection to the at least one broker and sending a status response message to the at least one broker via the active connection.

50. The publish/subscribe messaging system of claim 1, further comprising:
responsive to sending the multicast message claiming response and responsive to an absence of an active connection between the particular subscriber and the at least one broker, establishing the active connection to the at least one broker and sending a status response message to the at least one broker via the active connection.

* * * * *